United States Patent [19]

Scheuerle et al.

[11] Patent Number: 4,494,624
[45] Date of Patent: Jan. 22, 1985

[54] HYDRAULIC DRIVING SYSTEM WITH PROTECTION AGAINST OVERSPEED

[75] Inventors: Willy Scheuerle; Georg Prechtel, both of Pfedelbach, Fed. Rep. of Germany

[73] Assignee: Willy Scheuerle Fahrzeugfabrik GmbH & Co, Pfedelbach, Fed. Rep. of Germany

[21] Appl. No.: 376,836

[22] Filed: May 10, 1982

[30] Foreign Application Priority Data

May 19, 1981 [DE] Fed. Rep. of Germany ....... 3119808

[51] Int. Cl.³ ............................................. B62D 11/04
[52] U.S. Cl. ...................................... 180/308; 60/488; 137/504
[58] Field of Search ...................... 180/307, 308, 6.48, 180/305; 60/459, 488, 489, 494; 137/498, 504, 517

[56] References Cited

U.S. PATENT DOCUMENTS

| | | | |
|---|---|---|---|
| 3,424,196 | 1/1969 | Donner | 137/504 |
| 3,593,742 | 7/1971 | Taylor | 137/504 |
| 3,656,570 | 4/1972 | Gortnar | 180/308 |
| 3,717,213 | 2/1973 | Roe | 180/308 |
| 3,747,350 | 7/1973 | West | 60/459 |
| 3,788,078 | 1/1974 | Rubenstein | 60/488 |
| 3,838,573 | 10/1974 | Laumond | 60/488 |
| 3,913,453 | 10/1975 | Parget | 180/308 |
| 4,051,864 | 10/1977 | Iwatsuki | 137/504 |
| 4,237,926 | 12/1980 | Walker | 60/459 |

*Primary Examiner*—Joseph F. Peters, Jr.
*Assistant Examiner*—Michael Mar
*Attorney, Agent, or Firm*—Michael J. Striker

[57] ABSTRACT

A hydraulic driving system for vehicles having separate drives for each wheel. The system includes a plurality of hydraulic motors connected in parallel to high-pressure and suction ports of a pump. At least one restrictor having a non-linear response is connected in the parallel supply conduits branching to respective hydraulic motors, to limit the flow rate when a motor operates under unloaded conditions.

7 Claims, 2 Drawing Figures

HYDRAULIC DRIVING SYSTEM WITH PROTECTION AGAINST OVERSPEED

BACKGROUND OF THE INVENTION

The present invention relates in general to hydraulic driving systems, and in particular to a system for use in multiple-axle heavy-duty vehicles having drives for respective axles. The system is of the type which includes at least one pump and a plurality of hydraulic motors which are connected in parallel to respective high-pressure and suction ports of the pump.

When hydraulic motors in driving systems of this kind must operate under different loads to overcome different resistances, for example when some of the wheels of the vehicle are on a slippery surface whereas the traction of other wheels is normal, then there is a danger that motors working against the excessive load may run at an unduly low speed or even come to a standstill while practically the entire stream of pressure fluid delivered by the pump is supplied to the motors operating under the negligible load, causing the latter to attain excessive speed. This danger may occur also when the roadway for the vehicle has non-uniform frictional quality, for example when it is partially covered with ice. In this case, the motors pertaining to slipping wheels may also run at excessive speed and are subject to damage or breakdown.

SUMMARY OF THE INVENTION

It is therefore a general object of the present invention to overcome the aforementioned disadvantages.

More particularly, it is an object of the invention to provide a hydraulic driving system which eliminates the danger of breaking individual hydraulic motors due to overspeed caused by an excessive supply of hydraulic working fluid.

With these objects, and others which will become apparent hereafter, one feature of the invention resides in the provision of flow-restricting means arranged in the supply conduits for respective motors, the restricting means having a non-linear flow resistance and being adjusted for limiting excessive rates of flow in the conduits, to protect the motors against overspeed.

In hydraulic circuits where the direction of rotation of the motors is reversible, it is necessary to provide these restricting means also in the return conduits in addition to the supply conduits, so that the motors are protected for both rotational directions.

By virtue of the measures according to this invention the flow resistance of each branch conduit leading to an engine is automatically increased in response to the rate of flow of the supplied working fluid. As a result, the pump does not supply from its high-pressure port the pressure medium exclusively to one or more hydraulic motors operating at reduced load but delivers the pressure fluid also to the remaining motors. In this manner, the ratio of rotational speeds between the motors subject to the highest load and subject to the lowest load assumes a definite value, and in the case of different loads of driving motors in the vehicle the pressure fluid is distributed to all of the motors.

The arrangement of this invention thus prevents a detrimental overspeed of less loaded motors, and in addition has an effect which corresponds to that of a differential in conventional mechanical drives. In principle, the restricting device of this invention can be of any suitable design which performs the desired function. For example, it is possible to measure the flow rate in individual branch conduits, for instance electrically, and upon exceeding a predetermined threshold value of the flow the cross section of the corresponding branch conduit is strongly reduced.

From the point of view of structural simplicity, it is preferable to use a throttling or restricting device in which an orifice is controlled by a spring-loaded throttling element which, in the case of increasing flow, is displaced against the force of the spring to reduce the orifice without completely blocking the cross section of passage. The restricting member in its end position abuts against a seat or stop.

In order to prevent cavitation phenomena in the supply conduits, which might cause damage to the motors when the latter acts as a pump and tends to suck in the hydraulic medium from the supply conduits, for example when the vehicle encounters a steep slope, it is of advantage when additional means are provided for protecting the motors against backstrokes. These additional means include preferably a feeding conduit for an auxiliary pressure fluid communicating with the supply conduits for respective motors, preferably immediately downstream of the restricting device, so that in the case of underpressure in the supply branch conduits the auxiliary hydraulic medium is fed in and completely or substantially prevents the formation of cavitation bubbles.

The safety device against overspeed in the hydraulic driving systems of the aforedescribed type includes preferably a housing formed with a first bore for accommodating a throttle having a strongly flow-dependent resistance. The bore is connectable at one end to the hydraulic motor and at the other end to the high-pressure port of the pump. The feed-in conduit for the auxiliary hydraulic medium protecting against cavitation is connected via a backpressure valve to the space between the end of the bore leading to the motor and the throttling device. This arrangement limits automatically the rate of flow of the hydraulic working medium in the first bore and, by means of the backpressure valve, enables the application of the auxiliary pressure medium in the case when an underpressure develops leading to the danger of cavitation phenomena.

In hydraulic driving systems with reversible direction of rotation, it is of particular advantage when all high-pressure conduits and return conduits leading to the motors have the same configuration, so that they be capable of serving interchangeably both as supply and as return conduits.

In the latter case, it is also necessary that the overspeed protecting device include also a second bore identical to the first bore arranged parallel to the latter. In other words, the second bore also includes the throttling device and a backpressure valve communicating with the feed-in connection to the auxiliary pressure fluid, and one end of the second bore is connected to the return conduit whereas the other end is connected to the motor.

Preferably, both bores are formed parallel to each other in a housing block and interconnected by transverse passages housing the two backpressure valves. The connection for the auxiliary conduit is made in the form of a blind bore opening in the space between the backpressure valves. The transverse passage is preferably made throughout the housing block and is closed by screw plugs. In this manner, the overspeed protecting device includes a single block machined with three parallel bores and a transverse single bore, and consequently can be manufactured at low cost.

The screw plugs can be provided if desired with venting valves so that additional venting means can in most cases be dispensed with.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
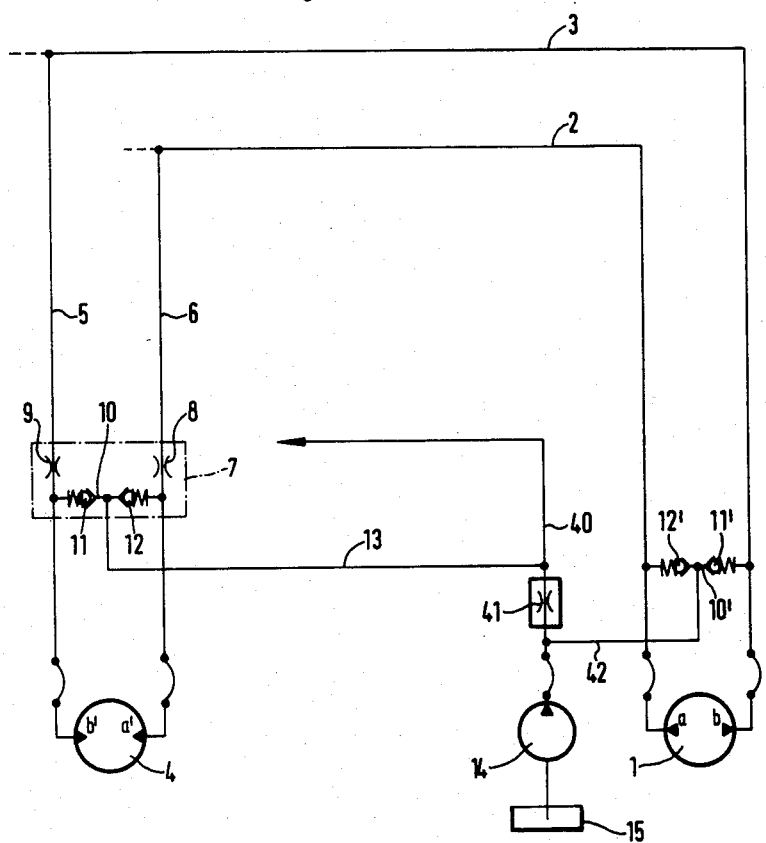
FIG. 1 is a schematic circuit diagram of the overspeed protected hydraulic driving system of this invention.

In FIG. 1, reference numeral 1 indicates a pump with ports a and b connected respectively to conduits 2 and 3. Depending on the direction of rotation of the pump, one of the two conduits is a high-pressure fluid supply conduit, and the other one is the return conduit. A plurality of hydraulic motors 4, of which only one is shown in the drawing, are connected in parallel to the conduits 2 and 3 by means of branch conduits 5 and 6. In this example, intake ports b' of individual motors are connected through branch conduits 5 and supply conduit 3 to the corresponding port b of the pump 1, and the outlet ports a' of the motors are connected through branch conduits 6 and return conduit 2 to the corresponding port a of the pump. So far this connection of the hydraulic system is known from prior art.

According to this invention, an overspeed safety device 7 is arranged in branch conduits 5 and 6 for respective motors. The device 7 consists essentially of flow-restricting devices 8 and 9, arranged in respective branch conduits 6 and 5 and each having a non-linear throttling resistance which at an increased flow rate of the working fluid sharply increases so as to limit the flow through respective branch conduits 5 and 6 and the assigned motor 4. In this manner, it is achieved that the remaining non-illustrated hydraulic motors 4 connected in identical manner parallel to the conduits 2 and 3, even if operating under unloaded conditions and thus susceptible to assume an excessive speed, are prevented from being supplied with a correspondingly increased amount of hydraulic pressure medium delivered by the pump, thus permitting normal supply of pressure fluid to the loaded motors.

As mentioned before, without the overspeed protection device according to this invention, the hydraulic motors operating under high load, while other hydraulic motors assume an unloaded, high-speed working condition, may cause the stoppage of the overloaded motors, excessive rotary speed of the underloaded motors. The overspeed safety device 7 further includes a transverse connection 10 connecting the branch conduits 5 and 6 between the ports of the assigned motor 4 and the ends of restrictors 8 and 9. The transverse conduit 10 includes two backpressure valves 11 and 12 which are normally closed by pressure fluid in the conduits 5 and 6. The seats of the backpressure valves 11 and 12 communicate via a feed-in conduit 13 with a control conduit 40 of the pump 1. An auxiliary pump 14, having its suction conduit connected to a tank 15, delivers additional working fluid through throttle 41 into the control conduit 40 and the feed-in conduit 13.

If one of the plurality of hydraulic motors 4 exceeds a maximum permissible rotary speed, then due to the action of restrictors or throttling devices 8 and 9 an underpressure relative to the auxiliary working fluid in conduit 13 may develop in parts of conduits 5 and 6 downstream of the restrictors 9 and 8. This pressure difference causes the opening of backpressure valves 11 and 12, the addition of working fluid from conduit 13 is applied to the hydraulic motors, thus preventing the formation of cavitation.

The control conduit 40, which operates under quasistatic conditions, also supplies the auxiliary pressure fluid into the conduit 13. Due to the throttling device 41 pertaining to the control conduit 40, a transitory pressure drop will occur in the conduit 40, due to the discharge of pressure fluid. This pressure drop in turn influences the pump 1, so that the latter delivers a reduced amount of pressure fluid.

In order to prevent cavitation also at the conduits 2 and 3 leading to the pump 1, there is also provided a corresponding transverse conduit 10' with backpressure valves 11' and 12' and an auxiliary conduit 42 leading to the outlet of pump 14. The auxiliary feed-in conduit 13, together with transverse conduits 10 and 10' with corresponding backpressure valves, serves also for replenishing hydraulic medium which may leak due to insufficient seals in pump 1 or hydraulic motors 4.

Figure 2:
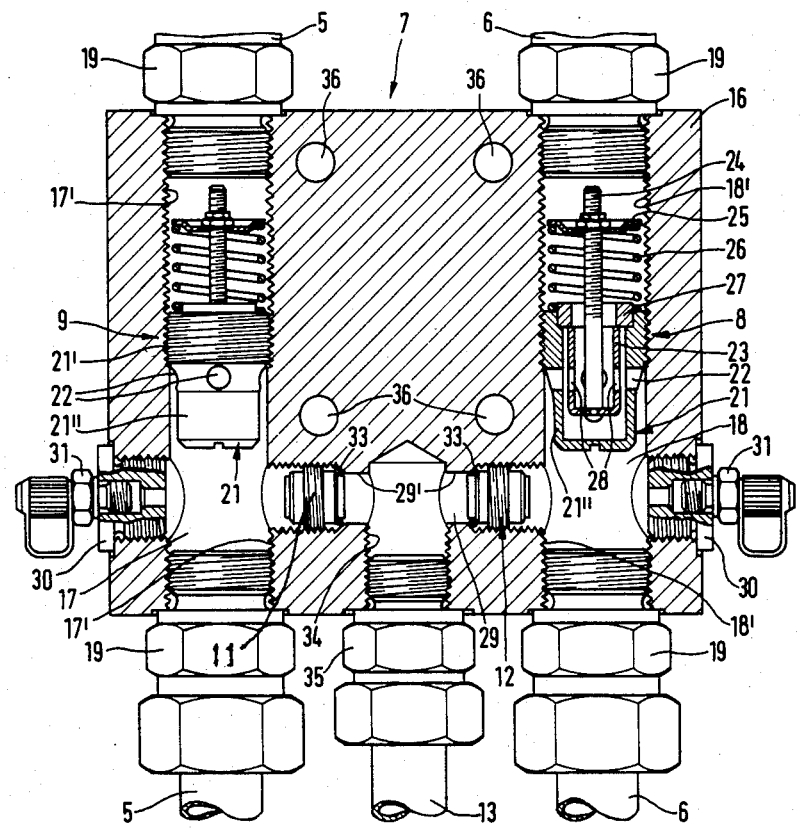
FIG. 2 shows in a sectional side view the overspeed protecting device for the system of FIG. 1.

The preferred embodiment of the flow-restricting device 7 as illustrated in FIG. 2 consists of a rectangular housing block 16 machined with two parallel throughbores 17 and 18 terminated with inner threads 17' and 18' at both ends thereof. Connecting nipples 19 for conduits 5 and 6 are screwed into the threaded end portions of the bores 17 and 18.

Each of the bores 17 and 18 accommodates a non-linear throttling arrangement 8 or 9 respectively consisting of a cup-shaped member 21 formed with outer thread which engages the inner thread 17' and 18' in respective bores. The threaded section 21' adjoins a frustoconical section which is provided with radial openings 22 and which continues with a cup-shaped closed part 21". The radial openings 22 constitute the orifices of the throttling devices 8 or 9, through which pressure fluid from conduits 5 and 6 can flow in either direction.

The open upper end of cup-shaped member 21 is provided with a stop ring 27 for an axially displaceable inner restricting member 23 having also a cup-shaped configuration. The inner restricting member 23 is connected at the center of its bottom with a rod 24 projecting through the stop ring 27 and being terminated with a stop plate 25 for a biasing helical spring 26 resting on the top surface of the stationary restricting member 21. The supporting plate 25 is also provided with openings to permit free passage of the hydraulic working fluid. The cylindrical wall of the inner restricting member 23 is also formed with radial openings or orifices 28 which are in alignment with the corresponding radial openings 22 of the outer restricting member 21. These openings 22 and 28 are in alignment when the inner restricting member 23 is in its rest position on the inner surface of the stop ring 27.

In the event that an excessive flow rate of working fluid develops in the upper portions of conduits 5 and 6, the movable inner member 23 is displaced downwardly, and consequently the effective cross section of the facing openings 22 and 28 is rapidly diminished. It will be noted, however, that there is always a minute clearance between the outer wall of the inner restricting member 23 and the inner wall of the outer restricting member 21, so that the throughflow is never completely interrupted. In reducing the cross section of the flow, the resistance of the restrictors sharply increases, and as a result the flow rate of the pressure fluid is correspondingly slowed down.

The lower part of housing block 16 is further provided with a stepped transverse throughbore 29 which interconnects the parallel bores 17 and 18 and which is closed at its ends by screw plugs 30 provided with venting valves 31.

The intermediate part 29' of the transverse passage 29 is reduced in diameter to form seats for backpressure valves 11 and 12. The backpressure valves are screwed into threaded inner wall portions of the passage 29 adjoining the intermediate portion 29' and are sealed against the latter by O-rings 33.

A blind bore 34 extending parallel to the throughbores 17 and 18 communicates with the intermediate part 29' in the housing block 16 and is connected by means of a connection piece 35 to the auxiliary feed-in conduit 13.

As explained before, if underpressure develops in the conduits 5 and 6 relative to the pressure in feed-in conduit 13, then the auxiliary pressure fluid is fed through the backpressure valves 11 or 12 and the corresponding part of the transverse conduit 29 into this conduit 5 or 6.

Holes 36 are provided in the housing block 16 for mounting the same means of screws, rivets or other fastening elements, to a supporting frame or the like.

It will be understood that each of the elements described above, or two or more together, may also find a useful application in other types of constructions differing from the types described above.

While the invention has been illustrated and described as embodied in a hydraulic driving system for use with heavy-duty vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A hydraulic driving system, particularly for use in multiple-axle heavy-duty vehicles with a motor drive for each axle, comprising at least one pump, a plurality of hydraulic driving motors each having an intake port and an outlet port, parallel branch conduits for connecting the high-pressure side and the suction side of the pump in parallel to the intake and outlet ports of the motors; and an overspeed protecting device arranged in said parallel branch conduits, said overspeed protecting device comprising a housing block formed with a first throughbore connectable between the high-pressure side of the pump and the intake port of each hydraulic motor, a first non-linear restrictor arranged in said first throughbore, a second throughbore connectable between the suction side of the pump and the outlet port of the motor, a second non-linear restrictor arranged in said second throughbore a blind bore for receiving additional pressure fluid from an auxiliary source, and a backpressure valve connecting the blind bore to the part of the first throughbore between the restrictor and the intake port of the motor.

2. An overspeed protecting device as defined in claim 1, wherein said housing includes an additional backpressure valve connecting said blind bore to the part of the second throughbore between the restrictor and the outlet connection to the motor.

3. An overspeed protecting device as defined in claim 2, wherein said housing block is formed with a transverse throughbore interconnecting said parallel throughbores and said blind bore, the open ends of said throughbore being closed by screw plugs, the part of said transverse throughbore at each side of said blind bore being provided with threads for holding said backpressure valves.

4. An overspeed protecting device as defined in claim 3, wherein said screw plugs are provided with venting valves.

5. A hydraulic driving system for use in multiple-axle heavy-duty vehicles with a motor drive for each axle, comprising at least one pump, a plurality of hydraulic driving motors each having an intake port and an outlet port, parallel branch conduits for connecting the high-pressure side and the suction side of the pump in parallel to the intake and outlet ports of the motors; a housing block having two throughbores, each throughbore being connected to a respective one of said branch conduits, flow-restricting means arranged within said housing block, said restricting means having non-linear flow resistance and being adjusted for limiting excessive rate of flow in the said parallel conduits to protect said motors against overspeed; said flow-restricting means includes a flow-dependent throttling device located within each of the throughbores, each device being constituted by an outer cup-shaped restricting member provided with radial orifices and with a stepped surface, a cup-shaped axially displaceable inner restricting member movable within said outer member and being provided with radial orifices, a biasing spring loading the movable inner member into a rest position in which the radial orifices are flush with the corresponding orifices in the outer member, said outer member in the range of its radial orifices being reduced in diameter and the outer surface of said inner member being spaced apart from the inner surface of said outer member about a clearance which permits a certain minimum flow even at a completely misaligned position of said radial orifices.

6. A hydraulic driving system as defined in claim 5, further comprising an auxiliary feed-in conuit communicating via a backpressure valve with the intake port of the motor to apply additional pressure medium to the motor when underpressure develops in said branch conduit connected to the high pressure side of the pump.

7. An overspeed protecting device as defined in claim 6, further including an auxiliary pump, an additional throttle connecting the high-pressure side of the auxiliary pump to said feed-in conduit and a control conduit leading from said additional throttle to said first-mentioned one pump whereby a pressure drop in the control conduit due to the discharge of pressure medium into the feed-in conduit causes the one pump to deliver a reduced amount of pressure medium to the motors.

* * * * *